United States Patent
Kuwahara et al.

(10) Patent No.: US 9,896,109 B2
(45) Date of Patent: Feb. 20, 2018

(54) VEHICLE CONTROL SYSTEM

(71) Applicant: TOYOTA JIDOSHA KABUSHIKI KAISHA, Toyota-shi (JP)

(72) Inventors: Seiji Kuwahara, Susono (JP); Kazumi Hoshiya, Gotemba (JP); Norimi Asahara, Numazu (JP); Yoshio Ito, Susono (JP); Takahito Endo, Nagaizumi-cho (JP); Tadashi Fujiyoshi, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/167,065

(22) Filed: May 27, 2016

(65) Prior Publication Data

US 2016/0347314 A1 Dec. 1, 2016

(30) Foreign Application Priority Data

Jun. 1, 2015 (JP) .................................. 2015-111536

(51) Int. Cl.
*B60W 30/182* (2012.01)
*B60W 10/06* (2006.01)
*B60W 10/11* (2012.01)
*B60W 10/184* (2012.01)
*F16H 61/02* (2006.01)

(52) U.S. Cl.
CPC .......... *B60W 30/182* (2013.01); *B60W 10/06* (2013.01); *B60W 10/11* (2013.01); *B60W 10/184* (2013.01); *B60W 2710/1005* (2013.01); *F16H 2061/0234* (2013.01)

(58) Field of Classification Search
CPC .... B60W 30/182; B60W 10/06; B60W 10/10; B60W 10/18; G05D 1/0088
See application file for complete search history.

(56) References Cited

U.S. PATENT DOCUMENTS

| | | | |
|---|---|---|---|
| 2002/0013650 A1* | 1/2002 | Kusafuka | F16H 61/0213 701/51 |
| 2013/0110343 A1 | 5/2013 | Ichikawa et al. | |
| 2015/0283998 A1* | 10/2015 | Lind | B60W 30/00 701/23 |
| 2015/0345621 A1* | 12/2015 | Sujan | F16H 61/0213 701/58 |
| 2016/0009291 A1* | 1/2016 | Pallett | B60W 50/082 701/23 |

FOREIGN PATENT DOCUMENTS

WO    WO 2011/15834 A1    12/2011

* cited by examiner

*Primary Examiner* — Aaron L Troost
(74) *Attorney, Agent, or Firm* — Oblon, McClelland, Maier & Neustadt, L.L.P.

(57) ABSTRACT

A vehicle control system configured to suppress engine noise in an autonomous mode is provided. An operating mode of the vehicle can be switched between a manual mode in which a driving force and a braking force of the vehicle are controlled by a manual operation and an autonomous mode in which the driving force and the braking force of the vehicle are controlled autonomously. The vehicle control system is configured to shift an upshifting point for reducing a speed ratio of a transmission to a low speed side in the autonomous mode, in comparison with the upshifting point set in the manual mode.

2 Claims, 5 Drawing Sheets

VEHICLE CONTROL SYSTEM

CROSS REFERENCE TO RELATED APPLICATIONS

The present invention claims the benefit of priority to Japanese Patent Application No. 2015-111536 filed on Jun. 1, 2015 with the Japanese Patent Office, the entire contents of which are incorporated herein by reference in its entirety.

BACKGROUND

Field of the Invention

Embodiments of the present invention relates to the art of a vehicle control system configured to operate a vehicle autonomously without requiring a driver to operate an accelerator and a brake, and especially to a vehicle control system configured to switch an operating mode of the vehicle between manual mode and autonomous mode.

Discussion of the Related Art

US2013/110343 A1 describes a driving assistance device configured to switch an operating mode of a vehicle between manual mode in which driving force and braking force are controlled manually by a driver and automated driving mode in which driving force and braking force are controlled autonomously, in response to a manual switching operation executed by the driver.

In the vehicle in which the operating mode can be switched between the autonomous mode and the manual mode, a speed of an engine is changed irrespective of the driver's intension under the autonomous mode, and hence engine noise may be sensed by the driver. In the conventional autonomous vehicle, therefore, the engine noise has to be reduced.

SUMMARY

Aspects of embodiments of the present application have been conceived noting the foregoing technical problems, and it is therefore an object of the present application is to provide a vehicle control system configured to reduce engine noise during propulsion in the autonomous mode.

The vehicle control system according to the preferred embodiment of the present application is applied to a vehicle having an engine and a transmission connected to the engine, and configured to switch an operating mode of the vehicle between a manual mode in which a driving force and a braking force of the vehicle are controlled by a manual operation and an autonomous mode in which the driving force and the braking force of the vehicle are controlled autonomously. In order to achieve the above-explained objective, according to the preferred embodiment of the present application, the vehicle control system is provided with a controller that is configured to shift an upshifting point for reducing a speed ratio of the transmission to a low speed side in the autonomous mode, in comparison with the upshifting point set in the manual mode.

In a non-limiting embodiment, the controller may be further configured to estimate a required driving force after a predetermined period of time in the autonomous mode, and to determine the speed ratio of the transmission based on an estimated maximum driving force until the end of predetermined period of time.

In a non-limiting embodiment, a geared transmission adapted to shift a gear stage thereof stepwise may be used as the transmission. In addition, the controller may be further configured to select the gear stage of smaller speed ratio when launching the vehicle in the autonomous mode in comparison with that selected in the manual mode.

Thus, according to the preferred embodiment of the present application, the upshifting point for reducing the speed ratio of the transmission is shifted to the low speed side in the autonomous mode, in comparison with that set in the manual mode. According to the preferred embodiment of the present application, therefore, the speed ratio of the transmission is reduced in the autonomous mode to reduce an engine speed. For this reason, engine noise can be suppressed in the autonomous mode.

BRIEF DESCRIPTION OF THE DRAWINGS

Features, aspects, and advantages of exemplary embodiments of the present invention will become better understood with reference to the following description and accompanying drawings, which should not limit the invention in any way.

FIGS. 2a and 2b show shifting diagrams stored in the electronic control unit, in which FIG. 2a is a shifting diagram for the autonomous mode, and in which FIG. 2b is a shifting diagram for the manual mode;

DETAILED DESCRIPTION OF THE PREFERRED EMBODIMENT(S)

Figure 5:
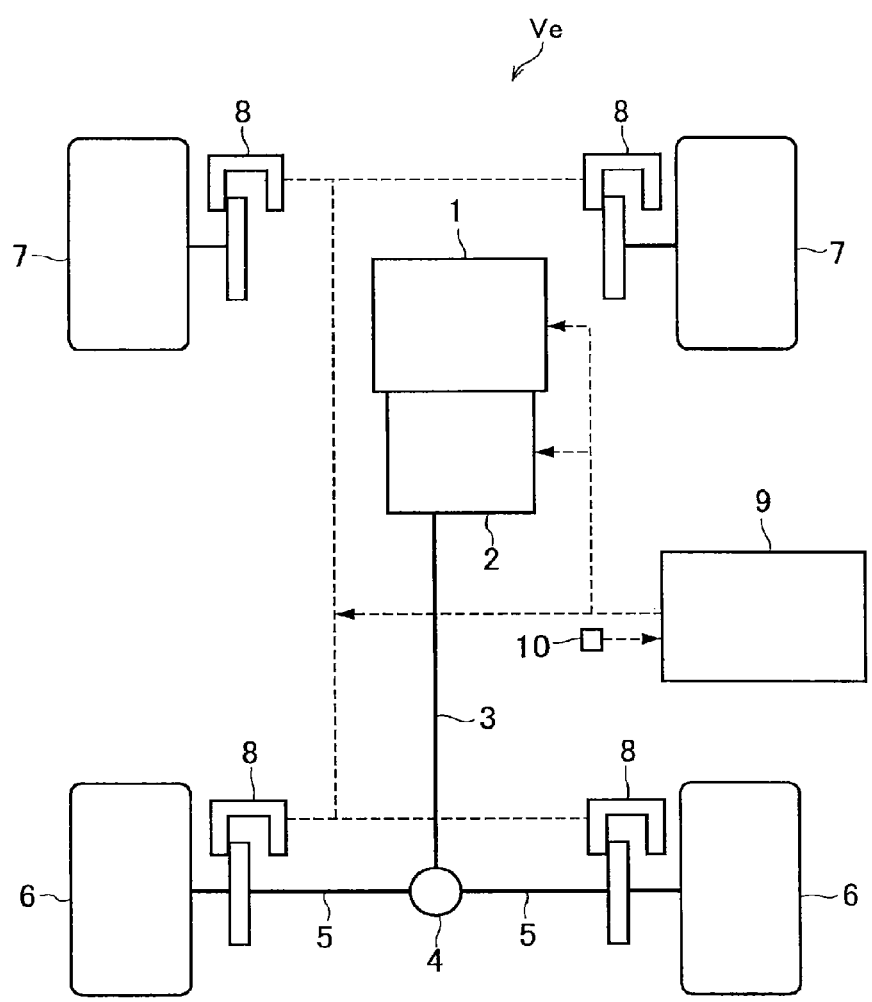
FIG. 5 is a schematic illustration showing the vehicle to which the control system according to the preferred embodiment is applied.

Preferred embodiment of the present application will now be explained with reference to the accompanying drawings. Referring now to FIG. 5, there is shown an example of a front-engine, rear-drive layout vehicle Ve to which the control system according to the preferred embodiment is applied. As illustrated in FIG. 5, the vehicle Ve comprises an engine 1, a transmission 2 connected to the engine 1, and drive wheels 6 connected to the transmission 2 through a propeller shaft 3, a differential gear unit 4 and a driveshaft 5. In the vehicle illustrated in FIG. 5, front wheels 7 are turned to change an orientation of the vehicle, and the front wheels 7 and the drive wheels 6 are individually provided with a brake device 8. The transmission 2 includes not only a geared transmission in which a speed ratio is changed stepwise but also a continuously variable transmission in which a speed ratio is changed continuously.

An operating mode of the vehicle Ve can be selected from a manual mode in which a driving force, a braking force, a steering angle etc. are changed manually in response to an operation executed by the driver, and an autonomous mode in which a driving force, a braking force, a steering angle etc. are controlled autonomously. In order to integrally control the engine 1, the transmission 2 and so on depending on the selected operating mode, the vehicle Ve is provided with an electronic control unit (to be abbreviated as the "ECU" hereinafter) 9 as a controller. To this end, detection signals and information from sensors 10 including on-board units are sent to the ECU 9. Although only one ECU 9 is depicted in FIG. 5, a plurality of ECUs 9 may be arranged in the vehicle Ve to control the above-mentioned devices individually.

Specifically, the sensor 10 includes an accelerator sensor for detecting an opening degree of an accelerator, a brake sensor for detecting a depression of a brake pedal, a steering sensor for detecting a steering angle of the steering device, an engine speed sensor for detecting a speed of the engine 1, an output speed sensor for detecting a speed of an output shaft of the transmission 2, a vehicle speed sensor for detecting a wheel speed of the vehicle Ve, a longitudinal acceleration sensor for detecting a longitudinal acceleration of the vehicle Ve, a lateral acceleration sensor for detecting a lateral acceleration of the vehicle Ve, a yaw rate sensor for detecting a yaw rate of the vehicle Ve and so on.

The sensor 10 further includes the following external sensors for detecting an external condition, such as an on-board camera, a RADAR (i.e., a radio detection and ranging) a LIDAR (i.e., a laser imaging detection and ranging) and so on. In addition, the on-board unit includes a switch for selecting the operating mode manually by the driver.

Specifically, the on-board camera is arranged inside of a windshield glass, and transmits recorded information about the external condition to the ECU 9. To this end, not only a monocular camera but also a stereo camera having a plurality of lenses and image sensors to achieve a binocular vision may be used as the on-board camera. If the stereo camera is used as the on-board camera, the ECU 9 is allowed to obtain three-dimensional information in the forward direction.

The RADAR is adapted to detect obstacles utilizing radio waves such as millimetric-waves and microwaves, and to transmit detected information to the ECU 9. Specifically, the RADAR detects an obstacle such as other vehicle and so on by emitting radio waves and analyzing the radio waves reflected from the obstacle.

Likewise, the LIDAR is adapted to detect obstacles utilizing laser light and to transmit detected information to the ECU 9. Specifically, the LIDAR detects an obstacle such as other vehicles and so on by emitting laser light and analyzing the laser light reflected from the obstacle.

In addition, the vehicle Ve is further provided with a GPS (i.e., global positioning system) receiver, a digital map database, and a navigation system. Specifically, the GPS receiver is adapted to obtain a position (i.e., latitude and longitude of the vehicle Ve) based on incident signals from GPS satellites, and to transmit the positional information to the ECU 9. The digital map database may be installed in the ECU 9, but map information stored in external online information processing systems may also be available. The navigation system is configured to determine a travelling route of the vehicle Ve based on the positional information obtained by the GPS receiver and the map database.

The ECU 9 carries out calculations based on the incident data or information from the sensors 10 and preinstalled data, and calculation results are sent in the form of command signal to the engine 1 and the transmission 2, and to actuators of the brake device, the steering device and so on.

In order to operate the vehicle 1 autonomously, the vehicle 1 is provided with a throttle actuator, a brake actuator, a steering actuator and so on. Specifically, the throttle actuator is adapted to change an opening degree of the throttle valve in response to reception of the command signal. The brake actuator is adapted to actuate the brake device to control braking force applied to the wheels 6 and 7 in response to reception of the command signal. The steering actuator is adapted to activate an assist motor of the steering device to control a steering torque in response to reception of the command signal.

The ECU 9 comprises a position recognizer, an external condition recognizer, a running condition recognizer, a travel plan creator, and a travel controller.

Specifically, the position recognizer is configured to recognize a current position of the vehicle Ve on the map based on the positional information received by the GPS receiver and the map database. The current position of the vehicle Ve may also be obtained from the positional information used in the navigation system. Optionally, the vehicle Ve may also be adapted to communicate with external sensors arranged along the road to obtain the current position of the vehicle Ve.

The external condition recognizer is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer is configured to recognize running condition of the vehicle Ve such as a vehicle speed, a longitudinal acceleration, a lateral acceleration, a yaw rate and so on based on detection result of the internal sensors.

The travel plan creator is configured to create a travel locus of the vehicle Ve based on a target course determined by the navigation system, a position of the vehicle Ve recognized by the position recognizer, and an external condition recognized by the external condition recognizer. That is, the travel plan creator creates a travel locus of the vehicle Ve within the target course in such a manner that the vehicle Ve is allowed to travel safely and properly while complying with traffic rules.

In addition, the travel plan creator is further configured to create a travel plan in line with the created travel locus. Specifically, the travel plan creator creates a travel plan in line with the target course based on the recognized external conditions and the map database.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator creates the future plan to change a vehicle speed, acceleration, steering torque etc. during travelling along the target course in the form of e.g., a map.

Alternatively, the travel plan creator may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

The travel controller is configured to operate the vehicle Ve autonomously by controlling a driving force, a braking force, a steering angle etc. in line with the travel plan created by the travel plan creator. To this end, specifically, the travel controller transmits command signals to the throttle actuator, the brake actuator, the steering actuator, the shifting actuator and so on in accordance with the travel plan.

By contrast, in the manual mode, the ECU 9 controls the above-mentioned actuators in response to manual operations of the accelerator, the brake, the steering device etc. executed by the driver.

Figure 1:
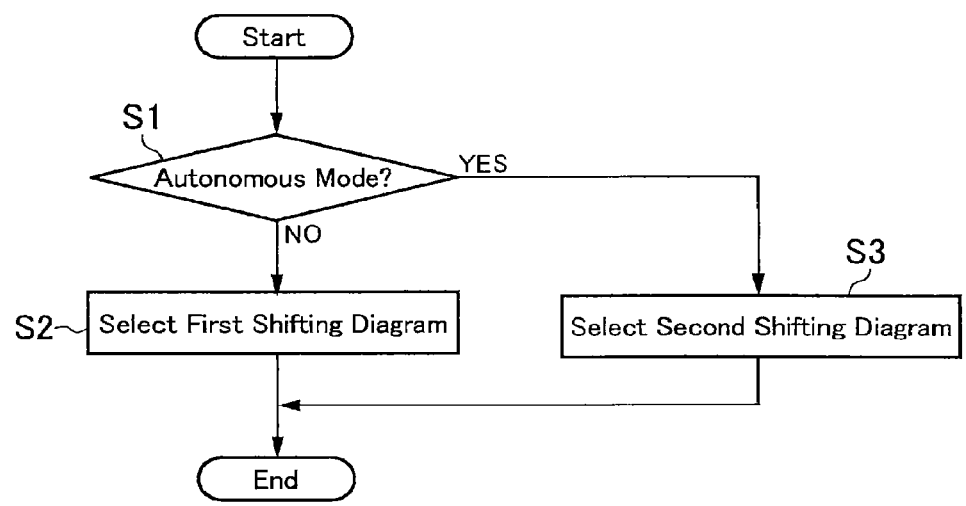
FIG. 1 is a flowchart showing a control example carried out by the control system.

Turning to FIG. 1, there is shown one example of a shifting control of the transmission 2 as a geared transmission, and the routine shown in FIG. 1 is repeated at a predetermined interval. First of all, it is determined at step S1 whether or not the autonomous mode is currently selected. Such determination at step S1 can be made based on a signal from the switch for selecting the operating mode, or by determining whether or not a flag representing the autonomous mode is erected.

Figure 2A:
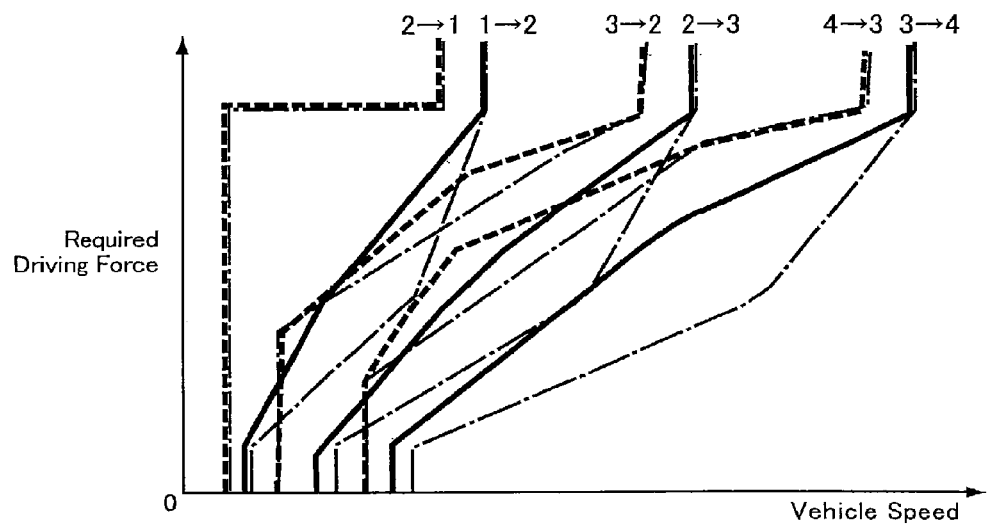
Figure 2B:
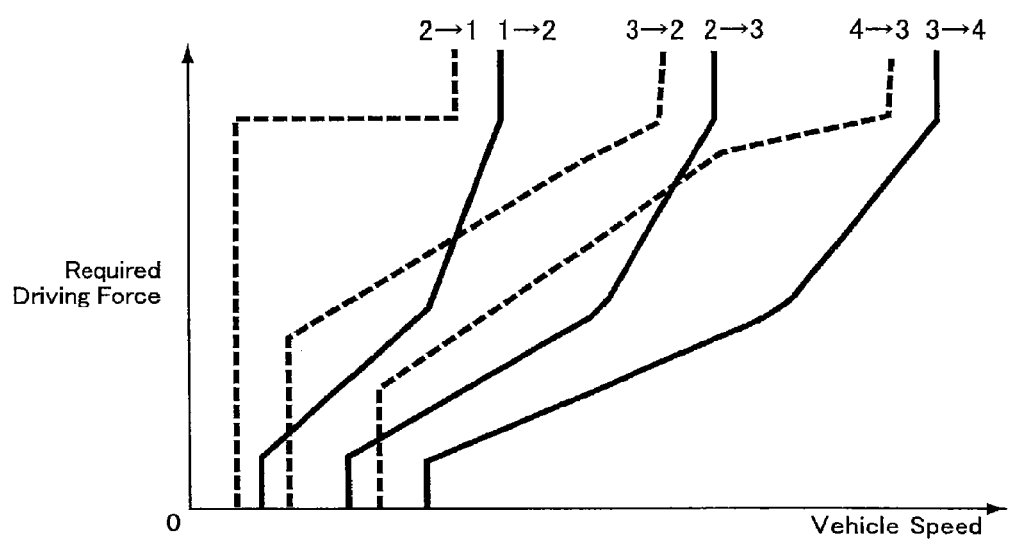

If the manual mode is currently selected so that the answer of step S1 is NO, the first shifting diagram shown in FIG. 2b is selected at step S2 and the routine is terminated. In the shifting diagram shown in FIG. 2b, a gear stage (i.e., a speed ratio) of the transmission 2 is determined based on a vehicle speed and a required driving force represented by an opening degree of a throttle valve.

By contrast, if the autonomous mode is currently selected so that the answer of step S1 is YES, the second shifting diagram shown in FIG. 2a is selected at step S3 and the routine is terminated. In the shifting diagrams shown in FIGS. 2a and 2b, each solid line is an upshifting line representing an upshifting to the higher gear stage where the speed ratio is smaller, each dashed line is a downshifting line to the lower gear stage where the speed ratio is larger, and each dashed-dotted line is a shifting line representing an upshifting and downshifting carried out in the manual mode.

The second shifting diagram is used to determine the gear stage of the transmission 2 in the autonomous mode based on the vehicle speed and the required driving force, and an opening degree of the throttle valve and or an accelerator may be used to determine the required driving force. Specifically, the second shifting diagram is adapted to carry out an upshifting at a lower speed in comparison with the first shifting diagram to achieve a larger required driving force, and to carry out a downshifting at a lower speed in comparison with the first shifting diagram when the required driving force is increased. As described, in the autonomous mode, the driving force is controlled in line with the travel plan or target course. That is, in the autonomous mode, the required driving force will not be changed significantly by a manual operation and hence it is not necessary to generate a large driving force on many occasions. In the autonomous mode, therefore, the gear stage of smaller speed ratio (i.e., the higher stage) is selected in comparison with that selected in the manual mode. Specifically, those shifting diagrams may be prepared by determining upshifting points and downshifting points based on a result or simulation or calculation, and the upshifting line and the downshifting line are determined by connecting the upshifting points and the downshifting points.

Thus, in the autonomous mode, the higher gear stage is selected in comparison with the manual mode. That is, in the autonomous mode, an engine speed at a predetermined vehicle speed can be reduced to be lower than that in the manual mode. For this reason, engine noise can be reduced and the fuel can be saved.

Figure 3:
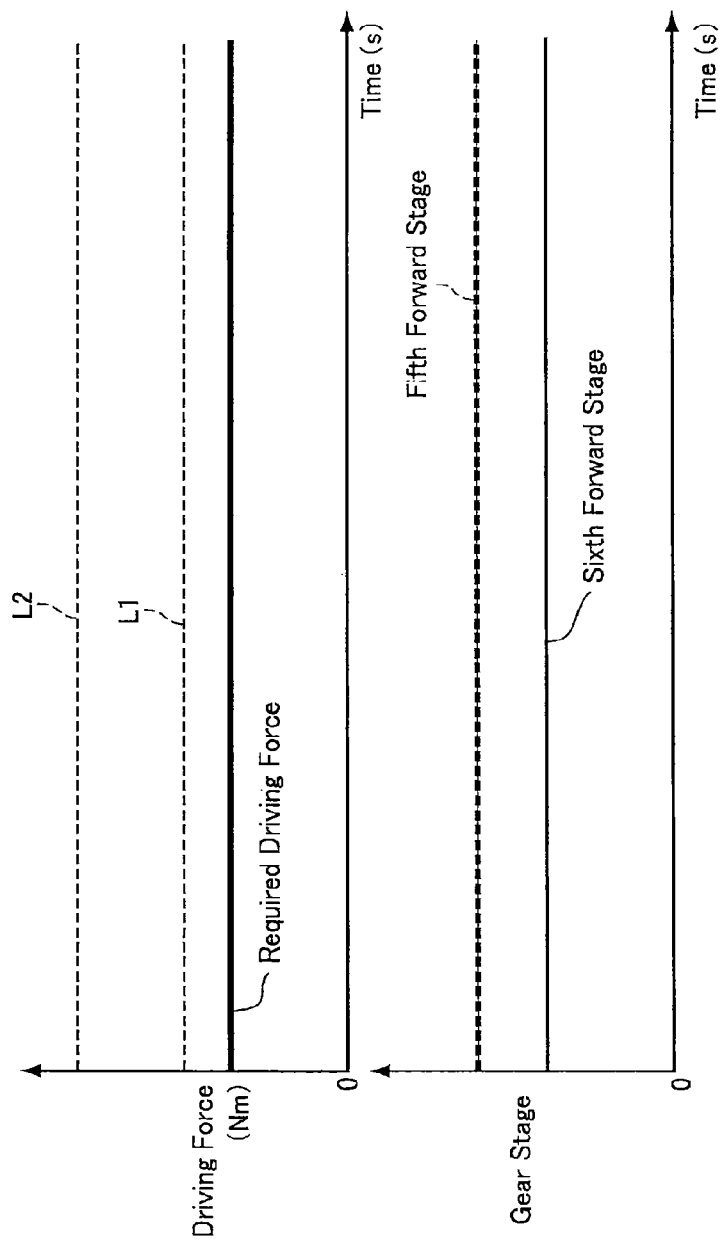
FIG. 3 is a time chart showing gear stages selected during cruising.

Turning to FIG. 3, there is shown an example of the gear stages selected in the autonomous mode and the manual mode. In the example shown in FIG. 3, the vehicle Ve is propelled at a constant speed by a constant driving force that is smaller than a maximum possible driving force in the sixth forward stage. In FIG. 3, line L1 represents a maximum possible driving force in the sixth forward stage, and line L2 represents a maximum possible driving force in the fifth forward stage.

As can be seen from FIG. 3, the maximum possible driving force in the sixth forward stage is reduced to be smaller than that in the fifth forward stage in accordance with a difference in the speed ratio therebetween. In the situation shown in FIG. 3, the required driving force is almost the maximum possible driving force to be achieved in the sixth forward stage. In this situation, if the driver increases an opening degree of the accelerator, the increased required driving force cannot be achieved unless shifting the gear stage to the fifth forward stage.

In the manual mode, therefore, the second shifting diagram is selected so that the gear stage can be shifted to the low speed stage (i.e., to the fifth forward stage in this case) when the driver depress the accelerator pedal so as to generate a larger driving force. By contrast, in the autonomous mode, such manual operation of the accelerator will not be executed by the driver, and hence the first shifting diagram is selected to propel the vehicle Ve in the high speed stage (i.e., in the sixth forward stage in this case). In this case, a deficiency in the driving force can be compensated by increasing an output torque of the engine 1.

In addition, in the autonomous mode, the driving force is controlled in line with the travel plan or target course so that the driving force to be required after a predetermined period of time can be estimated. Therefore, in order to prevent a frequent occurrence of gear shift, the gear stage may also be selected based on an estimated maximum driving force until the end of the predetermined period of time. In this case, shocks resulting from shifting the gear stage and noises resulting from changing an engine speed may be further suppressed.

Figure 4:
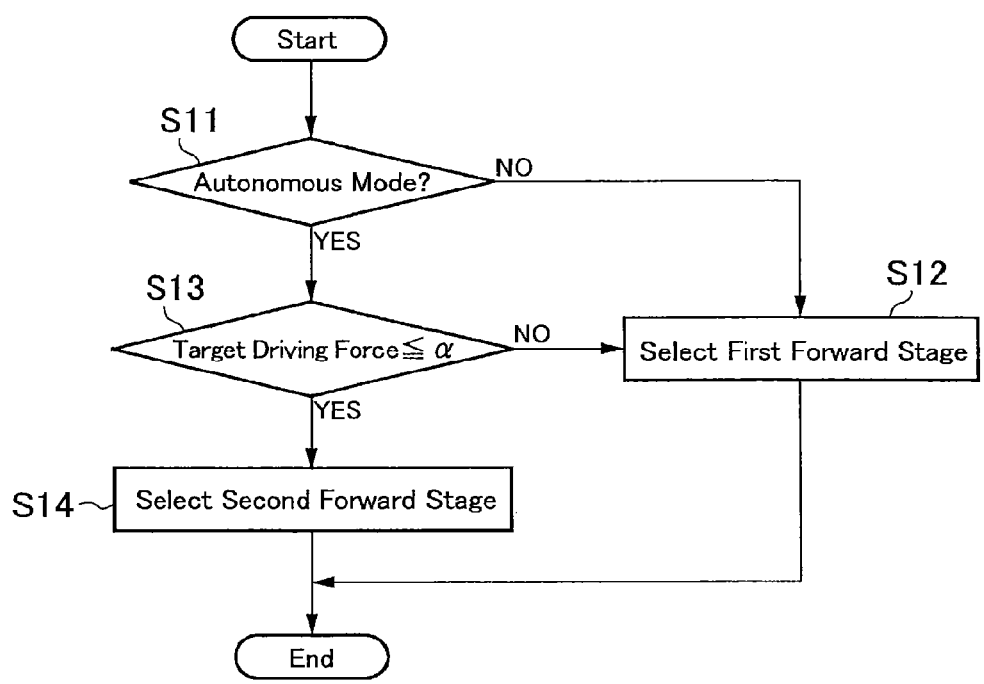
FIG. 4 is a flowchart showing a control example to select a gear stage when launching the vehicle.

In order to reduce the engine speed when launching the vehicle, the vehicle control system according to the preferred embodiment may be further configured to select the gear stage higher than the first forward stage to reduce the speed ratio if a driving force required to start the vehicle is relatively small. An example of such control is shown in FIG. 4, and the routine shown in FIG. 4 is repeated at a predetermined interval. First of all, it is determined at step S11 whether or not the autonomous mode is currently selected. Such determination at step S11 may also be made based on a signal from the switch for selecting the operating mode, or by determining whether or not the flag representing the autonomous mode is erected.

If the manual mode is currently selected so that the answer of step S11 is NO, the first forward stage where the speed ratio is largest is selected at step S12 to ensure accelerating response when a large driving force is required to start the vehicle, and the routine is terminated. By contrast, if the autonomous mode is currently selected so that the answer of step S11 is YES, it is determined at step S13 whether or not a target driving force is smaller than a threshold value α. Specifically, the target driving force is determined based on a road gradient on which the vehicle Ve is currently stopping and the travel plan or target course. For example, if the road gradient is large, or if a relatively large acceleration is required, the target driving force is increased. On the other hand, the threshold value α of the target driving force is determined to a level possible to generate in the second forward stage. Thus, possibility of launching the vehicle in the second forward stage is determined at step S13.

If the target driving force is larger than the threshold value a so that the answer of step S13 is NO, the routine also progresses to step S12 to select the first forward stage to start the vehicle. By contrast, if the target driving force is smaller than the threshold value a so that the answer of step S13 is YES, the routine progresses to step S14 to select the second forward stage to start the vehicle, and the routine is terminated.

Thus, in the autonomous mode, the gear stage of smaller speed ratio (i.e., the higher stage) is selected in comparison with that selected in the manual mode. For this reason, the engine speed can be reduced when launching the engine 1 so as to suppress the engine noise. In addition, when starting the engine 1, a change in the driving force resulting from a change in an output torque of the engine 1 can be reduced. For this reason, the engine 1 can be controlled properly in such a manner as to suppress shocks resulting from a change in an output torque of the engine 1.

Although the above exemplary embodiments of the present application have been described, it will be understood by those skilled in the art that the present application should not be limited to the described exemplary embodiments, and various changes and modifications can be made within the spirit and scope of the present application. For example, at step S13 shown in FIG. 4, it is also possible to determine whether or not the estimated driving force to be required after the predetermined period of time is smaller than the threshold value α. In this case, an occurrence of downshifting to the first forward stage can be prevented after launching the vehicle Ve to prevent occurrence of shift shock.

In addition, in order to select the higher stage in comparison with that selected in the manual mode, the upshifting line from the first forward stage to the second forward stage shown in FIG. 2a may be displaced to a position at which the vehicle speed and the opening degree of the throttle valve are "0", instead of carrying out the routine shown in FIG. 4.

Further, a continuously variable transmission may be used instead of the geared transmission. In this case, in the manual mode, a speed ratio of the continuously variable transmission is controlled in such a manner as to operate the engine in an optimally fuel efficient manner. By contrast, in the autonomous mode, the speed ratio of the continuously variable transmission is reduced in comparison with that in the manual mode. In this case, therefore, the engine speed may also be reduced when starting the engine in the autonomous mode to suppress the engine noise.

What is claimed is:

1. A vehicle control system that is applied to a vehicle having an engine and a transmission connected to the engine, and that is configured to switch an operating mode of the vehicle between a manual mode in which a driving force and a braking force of the vehicle are controlled by a manual operation and an autonomous mode in which the driving force and the braking force of the vehicle are controlled autonomously, comprising:

a controller that is configured to:

estimate a required driving force after a predetermined period of time in the autonomous mode; and shift an upshifting point for reducing a speed ratio of the transmission to a low speed side in the autonomous mode, in comparison with the upshifting point set in the manual mode, wherein the transmission includes a geared transmission that is adapted to shift a gear stage thereof stepwise, and wherein the controller is further configured to select the gear stage of smaller speed ratio when launching the vehicle in the autonomous mode in comparison with the gear stage selected in the manual mode.

2. A vehicle control system that is applied to a vehicle having an engine and a transmission connected to the engine, and that is configured to switch an operating mode of the vehicle between a manual mode in which a driving force and a braking force of the vehicle are controlled by a manual operation and an autonomous mode in which the driving force and the braking force of the vehicle are controlled autonomously, comprising:

a controller that is configured to:

estimate a required driving force after a predetermined period of time in the autonomous mode; and shift an upshifting point for reducing a speed ratio of the transmission to a low speed side in the autonomous mode, in comparison with the upshifting point set in the manual mode, wherein the controller is further configured to determine the speed ratio of the transmission based on an estimated maximum driving force until the end of the predetermined period of time, wherein the transmission includes a geared transmission that is adapted to shift a gear stage thereof stepwise, and wherein the controller is further configured to select the gear stage of smaller speed ratio when launching the vehicle in the autonomous mode in comparison with the gear stage selected in the manual mode.

* * * * *